United States Patent [19]

Muscat

[11] Patent Number: 4,618,180
[45] Date of Patent: Oct. 21, 1986

[54] LATCHING MECHANISM FOR CONVERTIBLE TOP

[76] Inventor: Peter P. Muscat, 14980 Waterfall Rd., Northville, Mich. 48167

[21] Appl. No.: 772,126

[22] Filed: Sep. 3, 1985

[51] Int. Cl.$^4$ ............................................. B60J 7/185
[52] U.S. Cl. ................................. 296/120 A; 296/107; 292/241; 292/304; 292/DIG. 5
[58] Field of Search ........... 296/107, 116, 117, 120 R, 296/120 A, 121; 292/240, 241, DIG. 5, 304, 58, 59, 61; 403/347, 348

[56] References Cited

U.S. PATENT DOCUMENTS 1,204,735  11/1916  Binder ........................ 296/120 R X
2,709,621  5/1955  Votypka et al. ................ 296/120 A

FOREIGN PATENT DOCUMENTS 30149 of 1897 United Kingdom ................ 292/241

Primary Examiner—Randolph A. Reese
Assistant Examiner—Russell D. Stormer
Attorney, Agent, or Firm—John R. Benefiel

[57] ABSTRACT

A latching mechanism is disclosed for securing a convertible top frame header member to the windshield frame including individual spaced latching mechanisms, each having a post mounted to the header and, a tubular socket mounted to the windshield frame with a cam ring mounted over the socket and carrying a projection passing through a cam slot formed in the socket and a groove formed in the post, moving together the frame members upon rotation of the cam ring. The cam rings are each rotated by an attached lever member with a cover moving into a recess formed in the windshield frame in the latched position to provide a smoothly contoured exterior.

6 Claims, 5 Drawing Figures

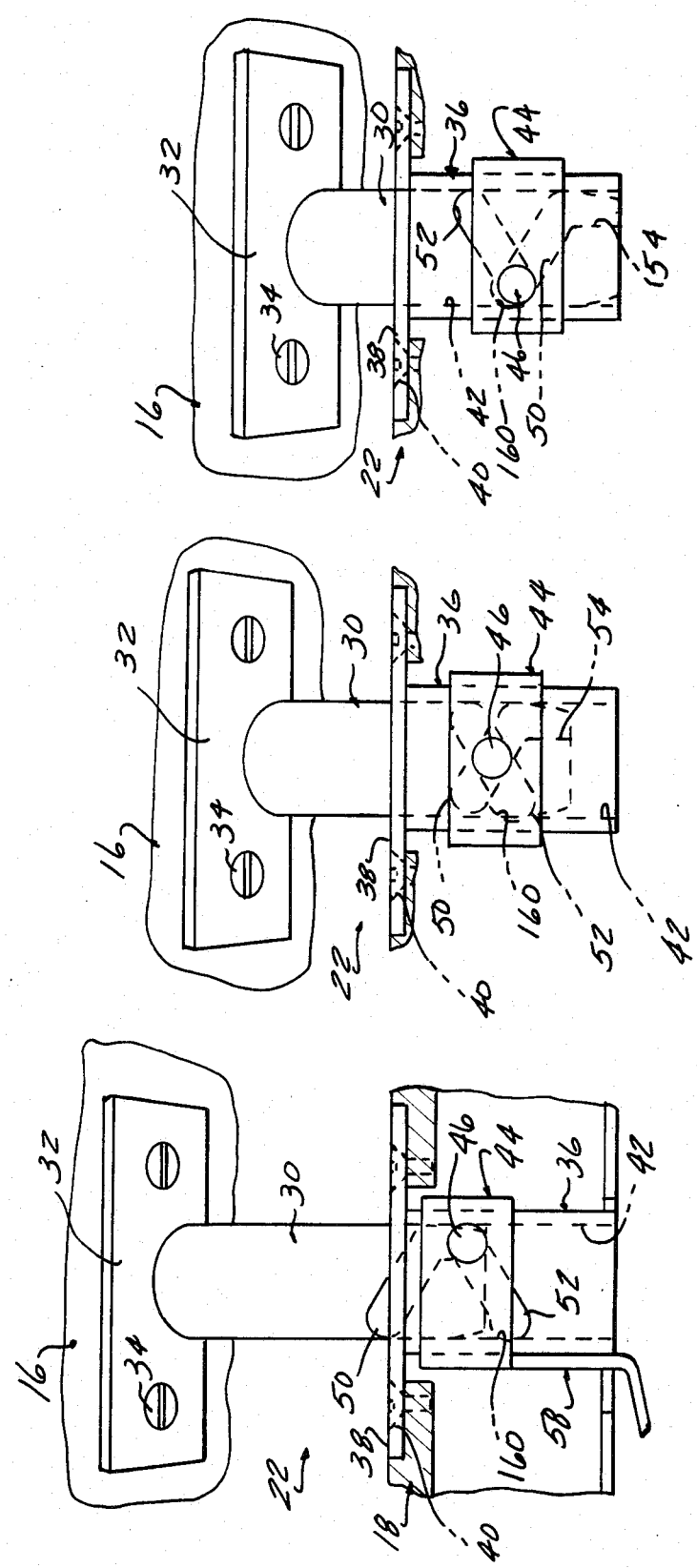

LATCHING MECHANISM FOR CONVERTIBLE TOP

BACKGROUND OF THE INVENTION

1. FIELD OF THE INVENTION

This invention concerns convertible top automobile bodies, and more particularly a latching mechanism for drawing together and locking the convertible top frame to the windshield with the convertible top in the raised position.

2. DESCRIPTION OF THE PRIOR ART

Automobiles having convertible tops include a convertible top frame adapted to be raised or lowered over the passenger compartment of the automobile body. The convertible top frame typically includes a number one bow or a header member at the forward section of the convertible top frame which moves so as to overly a windshield upper frame member extending transversly along the upper edge of the windshield. The header and windshield frame members are required to be drawn together to seal the passenger compartment and lock these members together in order to secure the top in the raised position.

Latching mechanisms have heretofore been provided to carry out this function, but typical such arrangements have included overcenter mechanisms to draw the frame members together upon manipulation of a toggle linkage.

Also, there has been provided spaced camming members cooperating with posts received in the header member upon movement of the convertible top frame to the raised position. Such mechanisms have required a fair degree of strength to operate and it would be advantageous to minimize the level of exertion required in order to improve the convenience of raising and lowering convertible tops.

Furthermore, the exposed linkages and handles etc., inherent in such arrangements present utilitarian, non-esthetic features in the interior of the passenger compartment.

Such elements also constitute hazardous projections in the forward regions of the passenger compartment, always a disadvantage in the design of the interior of the passenger compartment of automobiles.

Accordingly, it is an object of the present invention to provide a latching mechanism for convertible top automobiles in which a secure clamping and locking of the frame members is achieved but which requires only a modest exertion to operate, making the operation of the convertible top more convenient over mechanisms heretofore provided.

It is another object of the present invention to provide a latching mechanism in which the operating components exposed provide a smoothly contoured exterior such as to improve the esthetics as well as the safety aspects of such latching mechanism.

It is still another object of the present invention to provide such operating mechanism which is simple and reliable, and able to be manufactured at low cost, while providing the aforementioned advantages.

SUMMARY OF THE INVENTION

These and other objects of the present invention which will become apparent upon a reading of the following specification and claims are achieved by providing a pair of independently operated latching mechanisms spaced apart laterally on either side of the header and windshield frame members.

Each mechanism including a post and a corresponding tubular socket fixedly mounted to the respective frame members, each post adapted to the slidably received within a respective socket upon raising movement of the top frame to position the header member atop the windshield frame member.

Also provided in a cam ring surrounding and rotatably mounted over the exterior of the socket and having an inwardly extending projection passing through a slot formed in the socket wall and thence into a groove formed in the mating post.

The groove and slot extend about the circumference of the post and socket respectively while also extending axially in diverging directions away from each other, the slots and groove having aligned overlapped portions thereof when each post is inserted into its mating socket. A groove entry section is also provided extending axially from the free end of the post such that the cam ring projection may be received into the groove upon movement of the post into the socket.

Upon rotation of the cam ring, the projection causes a camming action reacting on the slot and groove to draw together the frame members. A slight indentation at the end of the slot provides a detenting in the fully locked position of the frame members.

Each of the cam rings is operated by means of a lever attached to the cam ring and extending outwardly to provide an easy but effective leverage for rotation of the cam ring to generate adequate clamping forces on the frame members. Each of the lever handles is provided with a fairing cover which moves into a recessed area extending along the windshield frame member as the handle is operated to latch the top, such as to present a smooth outer contour without sharp projections.

DESCRIPTION OF THE DRAWINGS

FIGS. 3, 4, 5 are fragmentary elevational views of the latching mechanism according to the present invention shown in various stages of operation.

DETAILED DESCRIPTION

In the following detailed description, certain specific terminology will be employed for the sake of clarity and a particular embodiment described in accordance with the requirements of 35 USC 112 but, it is to be understood that the same is not to be intended to be limiting and should not be so construed inasmuch as the invention is capable of taking many forms and variations within the scope of the appended claims.

Figure 1:
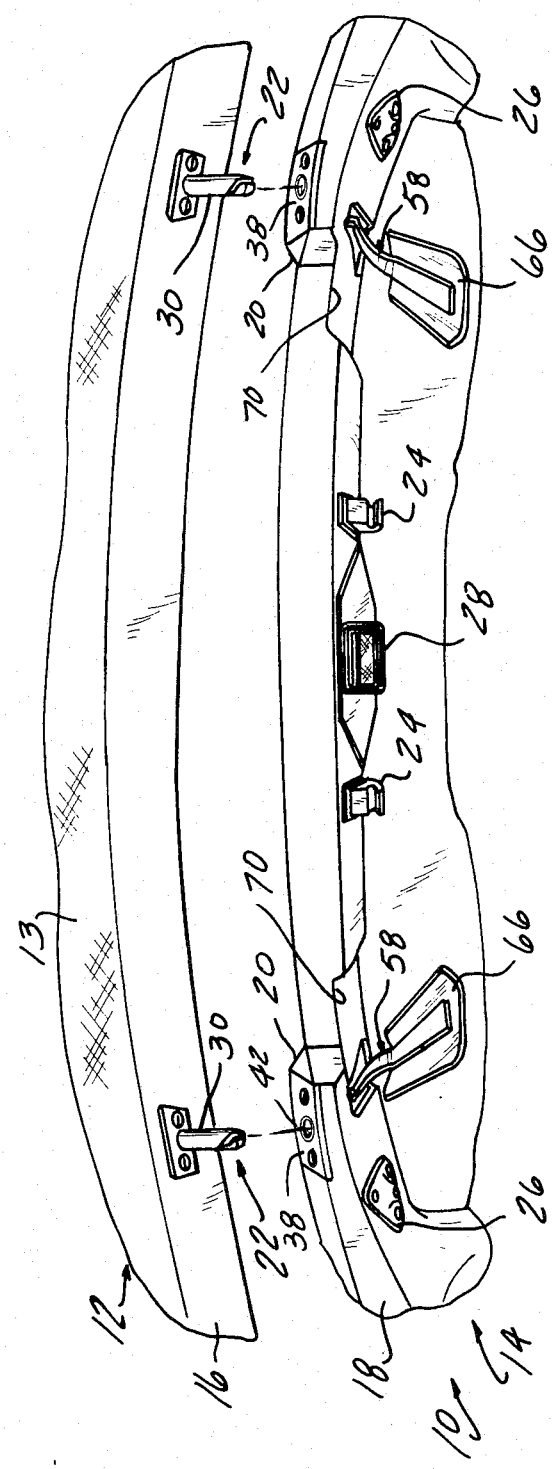
FIG. 1 is a fragmentary perspective view of portions of a convertible top automobile body viewed from the direction of the interior of the passenger compartment shown with the convertible top frame moving to the raised position and illustrating the installation of the latching mechanisms according to the present invention.

Referring to FIG. 1, a fragmentary portion of an automobile convertible body 10 as shown, including a convertible top frame 12 supporting a fabric top 13 and a windshield frame 14 supporting a windshield 15, defining in part the passenger compartment of an automobile of conventional design.

The convertible top frame 12 includes an elongated header member 16 extending transversely across the passenger compartment. The windshield frame 14 includes a top frame member 18 also extending transversely across the width of the vehicle, each adapted to overly each other upon movement of the convertible top frame 12 to the raised position with surfaces 20 and the windshield frame member 18 adapted to be drawn into tight sealing engagements with seals (not shown) on the header member 16, upon operation of a pair of latching mechanisms 22 indicated generally at 22.

The windshield frame 14 also provides a mounting for such conventional elements as visor mounting brackets 24, visor pivots 26, and vanity light 28.

Figure 2:
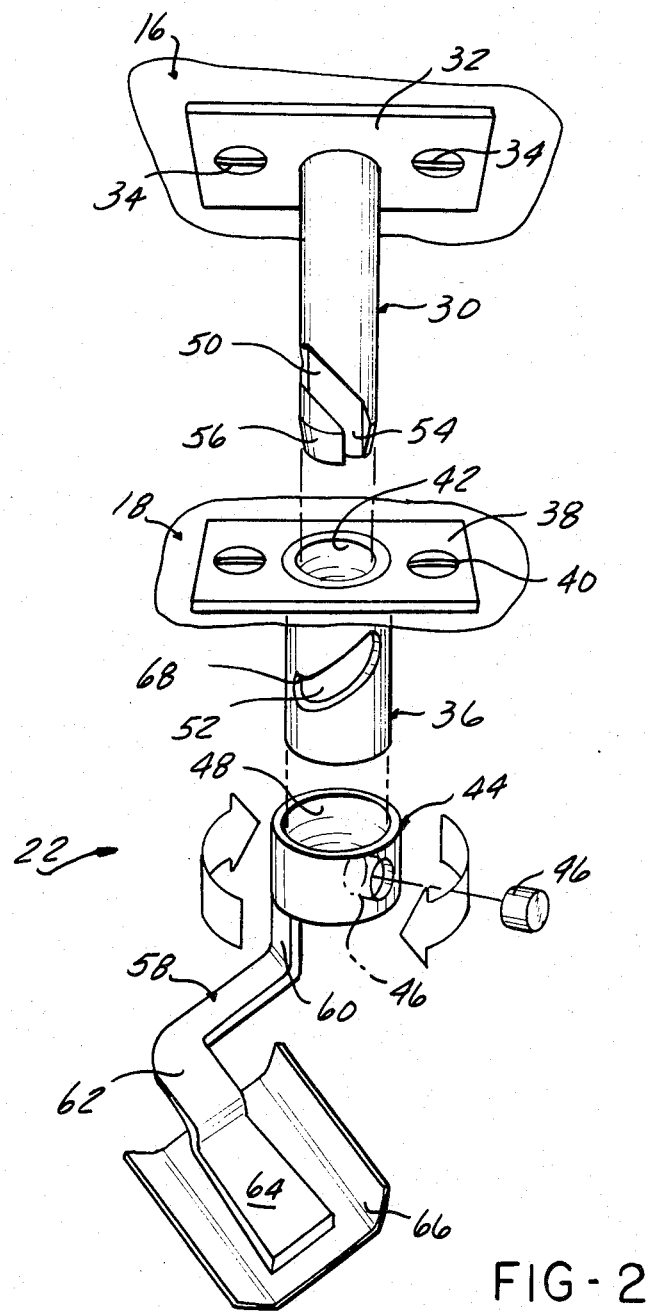
FIG. 2 is an exploded perspective view of the essential operating components of one of the latching mechanisms as shown in FIG. 1.

Referring to FIG. 2, the essential components of the latching mechanism 22 according to the present invention is shown in exploded form. Each mechanism 22 includes a post 30 fixedly mounted to one of the frame members here as shown as the header frame member 16 by means of a mounting plate 32 and mounting screws 34.

Mounted to the other frame member, i.e., windshield frame member 18, is a tubular socket 36 also fixedly mounted by means of an attached mounting plate 38 and mounting screws 40.

Thus, each element is rigidly mounted so as to prevent rotation thereof.

The post 30 is adapted to the slidably received within the interior 42 of the socket 36 upon movement of the header frame members 16 and 18 towards each other as the top frame 12 is moved to the raised position.

The final element is a cam ring 44 slidably received over the exterior of the socket 36 to be rotatable thereon and having a projection here taking the form of a pin 46 extending into the interior of the bore 48 received over the socket 36.

Post 30 is formed with a groove 50 recessed into the surface thereof and extending about the circumference of the post 30 and curving to also extend in an axial direction with respect to the post axis as shown.

Similarly, the socket 36 is formed with a through slot 52 extending circumferentially with respect to the axis of the socket 36 as well as axially, but the groove 50 and slot extend in opposite directions to diverge from each other as shown.

Each of the groove 50 and socket slot 52 have portions brought into axial alignment with each other upon movement of the post 30 into the socket 36. The groove 50 also includes an axially extending entry section 54 extending towards the chamfered free end of the post 30 such as to allow the projection 46 to be received into the projection 46 extending through that portion of the slot 52 brought into alignment with the groove 50 by entering the groove section 54.

An operating lever means is provided for the cam ring 44 to enable manual rotation thereof during operation of the latching mechanism 22, including a lever handle 58 including an offset segment 60 extending axially in order to pass out of the interior of the hollow windshield top frame member 18 (FIG. 3). The angled lever 62 terminating in a end section 64 covered with a fairing cover 66.

Referring to FIGS. 3, 4, and 5, the operation of the latching mechanism can be understood. In FIG. 3, the post 30 is introduced to be received within the interior bore 42 of the socket 36 during the last stages of movement of the convertible top frame 16 to the raised position. The rightmost portions of the groove 50 and slot 52 are vertically aligned, as can be seen in FIG. 3. The pin 46 of the cam ring 44 moves into the section 54 of the groove 50 as the header frame 16 is pulled down to thus enable the pin 46 to be passed through the slot 52 into the groove 50.

In FIG. 4 the cam ring 44 has been rotated such that the pin 46 has caused a camming action. The groove 50 and slot 52 axially diverge in opposite directions from each other such that a camming action is produced by a rotation of the camming ring 44, drawing together the post 30 and socket 36 and the attached frame members as shown.

This process is shown completed in FIG. 5 in which the pin 46 is moved to the right and moved into a slightly indented region 160 in the slot 52 to provide a detent in the fully latched position as shown in FIG. 5.

It should be appreciated that the mechanical advantage of this camming action requires only a minimal effort for a reliable and secure clamping and sealing of the header 16 to the windshield frame 18. Further, only a minimal motion required.

The fairing cover 66 moves during the latching action into correspondingly configured recesses formed in the windshield frame member 18 such as to provide a smoothly contoured exterior in the latched position, improving the esthetics of the interior design as well as eliminating the hazardous projections typical of prior art conventional latching mechanism designs.

Accordingly, it can be appreciated that the above recited objects of the present invention have been achieved by the present invention, as the latching mechanism is simple and yet effective and convenient in use.

I claim:

1. In an automobile convertible body having an enclosed passenger compartment including a convertible top frame with a transversely extending header member and a windshield frame including transversely extending windshield frame upper member overlain by said header member with said top frame in the raised position, adapted to be latched together, the improvement of a pair of laterally spaced latching mechanisms, each latching mechanism comprising:

an elongated post member fixedly mounted at one end to one of said top or windshield frame members:

a tubular socket fixedly mounted to the other of said top or windshield frame members, each located and adapted to slidably receive a respective post member upon raising movement of said top frame to cause said top and windshield frame members to overlie each other;

a cam ring, each slidably received over a respective socket to be rotatable thereon;

said post formed with a cam groove recessed into the surface thereof, progressing in axial and circumferential directions about the axis of said post;

said socket formed with a through slot also extending in axial and circumferential directions about the axis of said socket;

said groove and slot on said post and socket respectively having portions brought into axial alignment upon movement of said post into said socket, and each of said grooves and slots diverging axially from said aligned portions;

said post having an axially extending groove section extending from the free end of said post in circumferential alignment with said portion of said groove aligned axially with said portion of said slot;

said cam ring having a projection extending radially inward through said slot and into said groove upon movement of said post to be received within said socket;

lever means for enabling rotation of said cam ring, rotation of said cam ring of each of said pair of latching mechanism thereby moving said frame members so as to draw said top and windshield frame members together.

2. The automobile convertible body according to claim 1 wherein said lever means comprises independently movable lever handle attached to a said cam ring, and extending within said automobile passenger compartment to be accessible therein.

3. The automobile convertible body according to claim 2 wherein said socket is fixedly mounted to said windshield frame member and said lever handle includes an attached cover; and wherein said windshield frame member includes recesses located to receive a respective said lever handle covers with the attached cam ring in the fully latched position, said covers and handles configured to be moved into said recesses and present a smooth contour complementary to adjacent regions of said windshield frame member with said cam ring in said latched position.

4. The automobile convertable body according to claim 1 wherein each of said socket slots is formed with an end portion intended to provide a fully latched detail.

5. A latching mechanism for clamping and locking two members together, comprising:

an elongated post member, fixedly mounted at one end to one of said frame members;

a tubular socket fixedly mounted to the other of said top or windshield frame members, each located and adapted to slidably receive a respective post member upon raising movement of said frame to cause said frame members to overlie each other;

a cam ring, each slidably received over a respective socket to be rotatable thereon;

said post formed with a cam groove recessed into the surface thereof, progressing in axial and circumferential directions about the axis of said post;

said socket formed with a through slot also extending in axial and circumferential directions about the axis of said socket;

said groove and slot on said post and socket respectively having portions brought into axial alignment upon movement of said post into said socket, and each of said grooves and slots diverging axially from said aligned portions;

said post having an axially extending groove section extending from the free end of said post in circumferential alignment with said portion of said groove aligned axially with said portion of said slot;

said cam ring having a projection extending radially inward through said slot and into said groove upon movement of said post to be received within said socket;

lever means for enabling rotation of said cam ring, rotation of said cam ring of each of said pair of latching mechanism frame members together.

6. The latching mechanism according to claim 5 wherein said lever means comprises an independently movable lever handle attached to said cam ring.

* * * * *

UNITED STATES PATENT AND TRADEMARK OFFICE
CERTIFICATE OF CORRECTION

PATENT NO. : 4,618,180
DATED : October 21, 1986
INVENTOR(S) : Peter P. Muscat

It is certified that error appears in the above-identified patent and that said Letters Patent are hereby corrected as shown below:

Column 1, line 18, "overly" should be --overlie--.

Column 1, line 40, "esthetic" should be --aesthetic--.

Column 1, line 56, "esthetics" should be --aesthetics--.

Column 2, line 3, "including" should be --includes--.

Column 2, line 5, "to the" should be --to be--.

Column 2, line 9, "in" should be --is--.

Column 3, line 6, "overly" should be --overlie--.

Column 3, line 28, "to the" should be --to be--.

Column 3, line 61, "a" should be --an--.

Column 4, line 26, "esthetics" should be --aesthetics--.

Column 5, line 20, after "respective" insert --one of--.

Column 5, line 26, "convertable" should be --convertible--.

UNITED STATES PATENT AND TRADEMARK OFFICE
CERTIFICATE OF CORRECTION

PATENT NO. : 4,618,180

DATED : October 21, 1986

INVENTOR(S) : Peter P. Muscat

It is certified that error appears in the above-identified patent and that said Letters Patent is hereby corrected as shown below:

Column 6, line 28, delete "...of each of..." and insert therefor: --drawing--.

Signed and Sealed this

Twenty-fourth Day of February, 1987

Attest:

DONALD J. QUIGG

*Attesting Officer*   *Commissioner of Patents and Trademarks*